(12) United States Patent
Pesyna et al.

(10) Patent No.: US 12,025,074 B1
(45) Date of Patent: Jul. 2, 2024

(54) PLUG NOZZLE FOR HIGH MACH GAS TURBINE ENGINES

(71) Applicant: Rolls-Royce North American Technologies Inc., Indianapolis, IN (US)

(72) Inventors: Kenneth M. Pesyna, Indianapolis, IN (US); Andrew M. Simonich, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/233,673

(22) Filed: Aug. 14, 2023

(51) Int. Cl.
*F02K 1/56* (2006.01)
*F02K 1/60* (2006.01)

(52) U.S. Cl.
CPC .............. *F02K 1/566* (2013.01); *F02K 1/56* (2013.01); *F02K 1/60* (2013.01)

(58) Field of Classification Search
CPC ..... F02K 1/06; F02K 1/08; F02K 1/56; F02K 1/566; F02K 1/58; F02K 1/60
See application file for complete search history.

(56) References Cited

U.S. PATENT DOCUMENTS

| | | | |
|---|---|---|---|
| 3,807,639 A * | 4/1974 | Soligny | F02K 1/08 239/265.19 |
| 4,147,027 A | 4/1979 | Greathouse | |
| 4,802,629 A | 2/1989 | Klees | |
| 5,794,433 A | 8/1998 | Peters et al. | |
| 5,806,302 A | 9/1998 | Cariola et al. | |
| 5,875,995 A | 3/1999 | Moe et al. | |
| 6,045,091 A | 4/2000 | Baudu et al. | |
| 6,487,845 B1 | 12/2002 | Modglin | |
| 7,146,796 B2 | 12/2006 | Lair | |
| 8,002,217 B2 | 8/2011 | Sternberger | |
| 8,051,639 B2 | 11/2011 | Lair | |
| 8,091,827 B2 | 1/2012 | Lair | |
| 8,459,036 B2 | 6/2013 | Baker | |
| 8,677,733 B2 | 3/2014 | Beardsley et al. | |
| 8,915,060 B2 | 12/2014 | Parham | |
| 9,181,899 B2 | 11/2015 | Dindar et al. | |
| 9,534,562 B2 | 1/2017 | Biset | |
| 9,970,387 B2 | 5/2018 | Frank et al. | |
| 10,174,716 B2 | 1/2019 | Kohlenberg et al. | |
| 10,400,621 B2 | 9/2019 | Sawyers-Abbott et al. | |
| 10,724,474 B2 | 7/2020 | Gormley | |
| 10,830,177 B2 | 11/2020 | Gormley | |
| 11,149,686 B2 | 10/2021 | Calder et al. | |
| 11,286,878 B2 | 3/2022 | Taylor et al. | |
| 11,378,037 B2 | 7/2022 | Song | |
| 11,408,368 B2 | 8/2022 | Sutterfield et al. | |
| 2016/0097346 A1 * | 4/2016 | Rhoden | F02K 1/09 60/204 |
| 2021/0301760 A1 * | 9/2021 | Sutterfield | F02K 1/62 |
| 2022/0235668 A1 | 7/2022 | Sanderson et al. | |

* cited by examiner

*Primary Examiner* — Scott J Walthour
(74) *Attorney, Agent, or Firm* — Barnes & Thornburg LLP

(57) ABSTRACT

A propulsion unit includes a gas turbine engine and an exhaust nozzle coupled to an aft end of the gas turbine engine. The exhaust nozzle is configured to interact with exhaust gases exiting the gas turbine engine in an aft direction. The exhaust nozzle includes an outer nozzle case and an inner plug that cooperate to define an exhaust flow path therebetween. The exhaust nozzle is configured to manipulate the exhaust gases to provide different thrust capabilities for the gas turbine engine.

15 Claims, 12 Drawing Sheets

PLUG NOZZLE FOR HIGH MACH GAS TURBINE ENGINES

FIELD OF THE DISCLOSURE

The present disclosure relates generally to gas turbine engines, and more specifically to gas turbine engines including a plug nozzle.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Exhaust nozzles can have size and shape to optimize engine operation. A larger exhaust nozzle area can reduce velocity of the exhaust air and lower noise emissions of the engine. The shape of the exhaust nozzle can optimize the exhaust flow exiting the engine to increase engine efficiency and improve thrust. In some applications, the exhaust nozzle mixes the hot exhaust air from the turbine with cooler by-pass duct air.

Some exhaust nozzles include structures that redirect exhaust gases for reverse thrust. It can be challenging to integrate such structures in a supersonic aircraft while minimizing noise produced by the engine in certain situations.

SUMMARY

The present disclosure may comprise one or more of the following features and combinations thereof.

In accordance with aspects of the present disclosure, an exhaust nozzle for a turbine engine includes an outer nozzle case arranged to extend around a central axis. The outer nozzle case may have an outer surface facing away from the central axis and an opposite inner surface facing toward the central axis and defining an interior space radially inwardly from the inner surface.

In some embodiments, the exhaust nozzle includes an nozzle plug located at least partially within the interior space and along the central axis and configured to interact with hot exhaust gases flowing through the interior space in an aft direction to guide the hot exhaust gases out of the interior space through an exhaust outlet at an aft end of the outer nozzle case.

In some embodiments, the nozzle plug includes a stationary tailcone located within the interior space upstream of the exhaust outlet, a movable plug body extending in the aft direction away from the stationary tailcone along the central axis, and a plurality of support struts coupled to the movable plug body and spaced circumferentially apart from one another around the central axis to support the movable plug body along the central axis.

In some embodiments, the exhaust nozzle includes a plug actuator coupled with the outer nozzle case and the movable plug body and configured to move the movable plug body relative to the outer nozzle case and the stationary tailcone between a slid-forward position and a slid-back position.

In some embodiments, the movable plug body includes a plug tail having a variable-diameter, a plug stem coupled with a forward end of the plug tail and having a substantially constant diameter, and a plug guide fixed to the plug stem for movement therewith and configured to engage the stationary tailcone to block rotation of the movable plug body relative to the stationary tailcone about the central axis.

In some embodiments, the stationary tailcone is formed to include a stem-receiving space located along the central axis and the plug stem extends into the stem-receiving space of the stationary tailcone.

In some embodiments, the plug stem extends into the stem-receiving space in both the slid-forward position and the slid-back position.

In some embodiments, the plug guide includes a plurality of rollers spaced circumferentially around the central axis from one another and protruding radially outward from an outer surface of the plug stem to engage with an interior surface defining the stem-receiving space.

In some embodiments, the stem-receiving space includes a plurality of guide slots spaced circumferentially apart from one another, and wherein each roller included in the plurality of rollers is configured to extend into a respective guide slot included in the plurality of guide slots.

In some embodiments, the plug actuator includes an actuator ring coupled to each of the support struts, an actuator piston coupled to the actuator ring and to the outer nozzle case and configured to translate the actuator ring forward and aft to move the plug body and the plurality of support struts between the slid-forward position and the slid-back position, and a plurality of ring guides coupled to the actuator ring and to the outer nozzle case to guide movement of the actuator ring relative to the outer nozzle case.

In some embodiments, the plurality of ring guides includes a plurality of rollers that engage the outer nozzle case and roll along the outer nozzle case as the actuator piston moves the actuator ring forward and aft.

In some embodiments, the outer nozzle case is formed to include a ring cavity and the actuator ring is received in the ring cavity when the plug body is in the slid-forward position and the actuator ring is partially removed from the ring cavity to form a portion of an outer exhaust gas boundary with the inner surface of the outer nozzle case when the plug body is in the slid-back position.

In some embodiments, the outer nozzle case is formed to include a plurality of slots that open radially inward into the ring cavity, and wherein each of the rollers is received in a respective slot included in the plurality of slots.

In some embodiments, each of the struts included in the plurality of struts is aligned circumferentially with at least one slot included in the plurality of slots.

In some embodiments, the plurality of rollers includes a plurality of forward rollers and a plurality of aft rollers spaced apart from the plurality of forward rollers.

In some embodiments, each of the struts included in the plurality of struts is aligned circumferentially with at least one roller included in the plurality of rollers.

In some embodiments, each of the plurality of struts extends inwardly toward the central axis away from the actuator ring and aft away from the actuator ring.

In some embodiments, each of the rollers is configured to rotate about a roller axis that extends through the central axis.

In some embodiments, the plug stem has a first diameter, and the plug tail has a second diameter, greater than the first diameter, at a first end of the plug tail closest to the plug stem, a third diameter, less than the first diameter and the second diameter, at a second end of the plug tail furthest from the plug stem, and a fourth diameter, greater than the first, second, and third diameters, axially between the first end and the second end.

In accordance with aspects of the present disclosure, an exhaust nozzle for a turbine engine includes an outer nozzle case arranged to extend around a central axis. The outer nozzle case has an outer surface facing away from the central axis and an opposite inner surface facing toward the central axis and defining an interior space radially inwardly from the inner surface.

In some embodiments, the exhaust nozzle includes a nozzle plug located at least partially within the interior space and along the central axis and configured to interact with hot exhaust gases flowing through the interior space in an aft direction to guide the hot exhaust gases out of the interior space through an exhaust outlet at an aft end of the outer nozzle case, the nozzle plug including a movable plug body extending in the aft direction along the central axis and a plurality of support struts coupled to the movable plug body and spaced circumferentially apart from one another around the central axis to support the movable plug body along the central axis.

In some embodiments, the exhaust nozzle includes a plug actuator coupled with the outer nozzle case and the nozzle plug and configured to move at least a portion of the nozzle plug relative to the outer nozzle case between a slid-forward position and a slid-back position.

In some embodiments, the plug actuator includes an actuator ring coupled to each of the support struts, an actuator piston coupled to the actuator ring and to the outer nozzle case and configured to translate the actuator ring forward and aft to move the plug body and the plurality of support struts between the slid-forward position and the slid-back position, and a plurality of ring guides coupled to the actuator ring and to the outer nozzle case to guide movement of the actuator ring relative to the outer nozzle case and block circumferential rotation of the movable plug body and the plurality of support struts about the central axis.

In some embodiments, the plurality of ring guides includes a plurality of rollers that engage the outer nozzle case and roll along the outer nozzle case as the actuator piston moves the actuator ring forward and aft.

In some embodiments, the outer nozzle case is formed to include a ring cavity and the actuator ring is received in the ring cavity when the plug body is in the slid-forward position and the actuator ring is partially removed from the ring cavity to form a portion of an outer exhaust gas boundary with the inner surface of the outer nozzle case when the plug body is in the slid-back position.

In some embodiments, the outer nozzle case is formed to include a plurality of slots that open radially inward into the ring cavity, and wherein each of the rollers is received in a respective slot included in the plurality of slots.

In some embodiments, the nozzle plug further includes a stationary tailcone located within the interior space upstream of the exhaust outlet and formed to include a stem-receiving space.

In some embodiments, the movable plug body includes a plug tail, a plug stem coupled with a forward end of the plug tail and arranged to extend into the stem-receiving space formed in the stationary tailcone, and a plug guide fixed to the plug stem for movement therewith and arranged to extend into a guide slot opening into the plug-receiving space to block rotation of the movable plug body relative to the stationary tailcone about the central axis.

These and other features of the present disclosure will become more apparent from the following description of the illustrative embodiments.

DETAILED DESCRIPTION OF THE DRAWINGS

Figure 1:
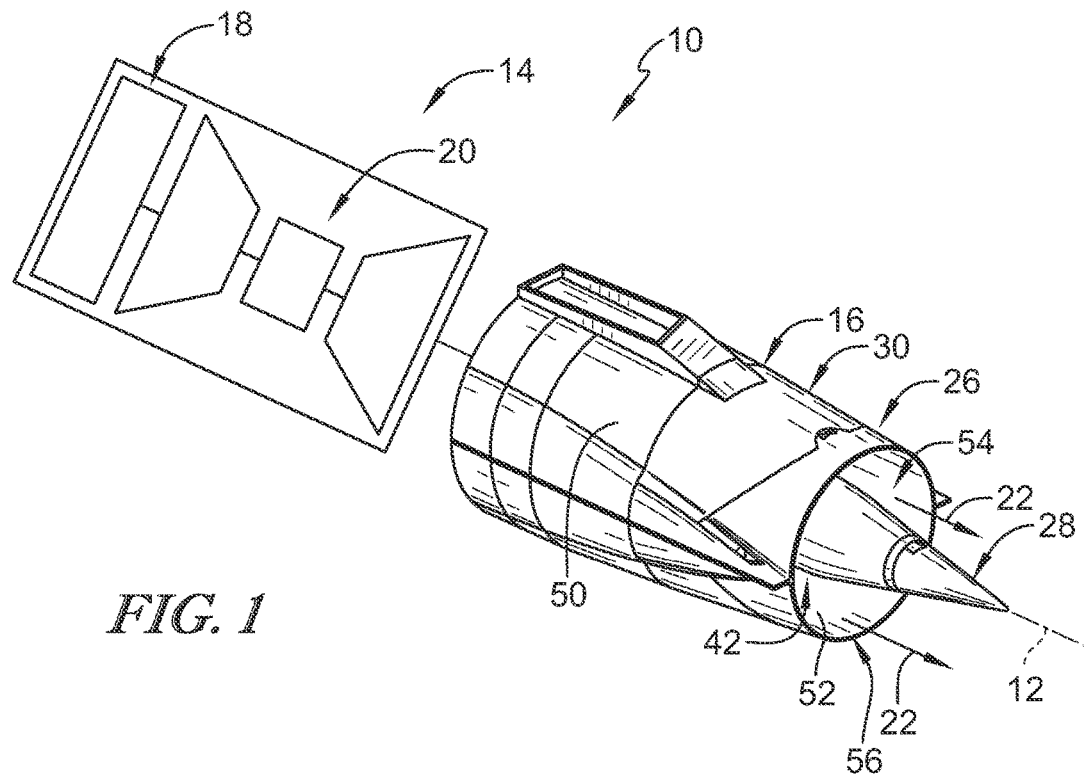
FIG. 1 is a perspective view of a propulsion unit for an aircraft including a gas turbine engine and an exhaust nozzle coupled to an aft end of the showing the gas turbine and configured to interact with exhaust air exiting the gas turbine engine.

For the purposes of promoting an understanding of the principles of the disclosure, reference will now be made to a number of illustrative embodiments illustrated in the drawings and specific language will be used to describe the same.

Figure 2:
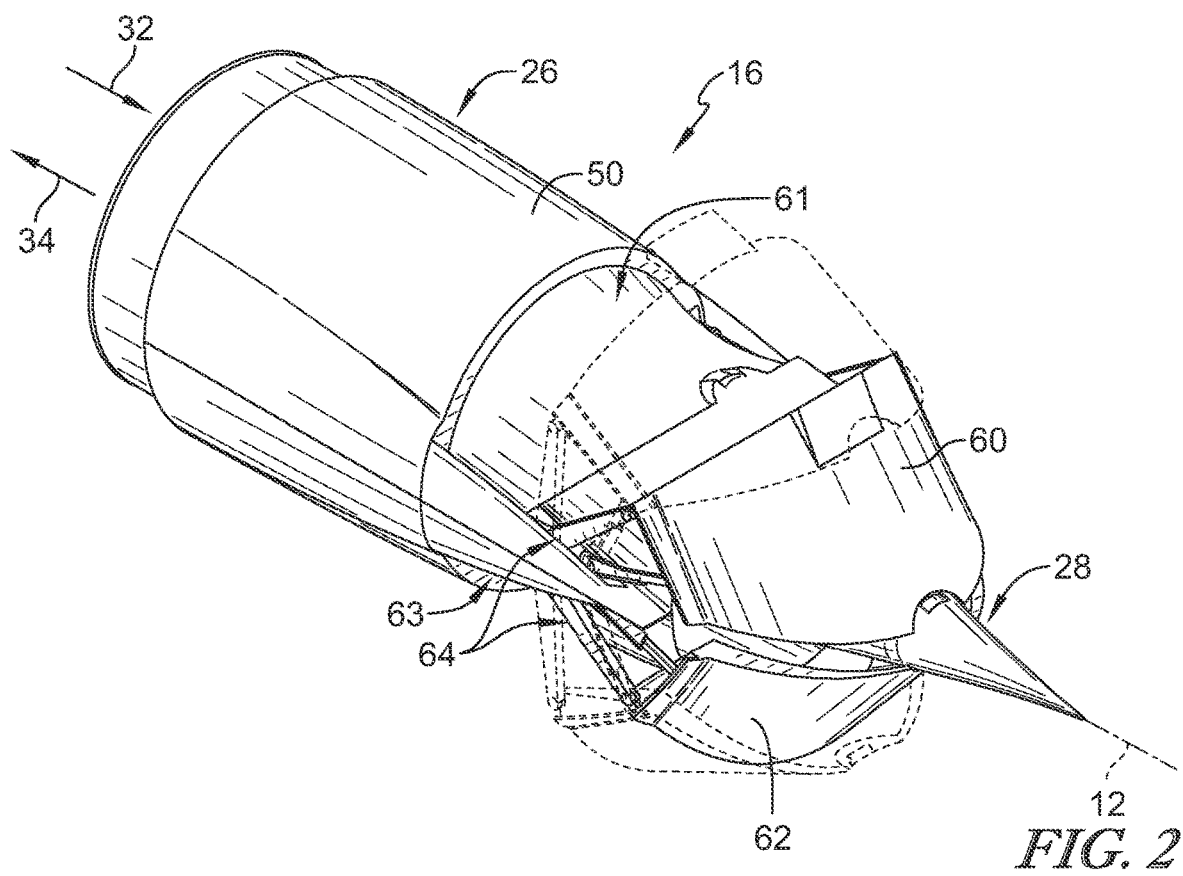
FIG. 2 is a perspective view of the exhaust nozzle from FIG. 1 showing that the exhaust nozzle includes an outer nozzle case defining an interior space, a nozzle plug arranged to lie at least partially within the interior space, and a thrust reverser configured to redirect the exhaust air exiting through an outlet formed at an aft end of the outer nozzle case and the nozzle plug in a forward direction to provide reverse thrust for the aircraft.

A propulsion unit 10 for an aircraft according to the present disclosure includes a gas turbine engine 14 and an exhaust nozzle 16 coupled to the gas turbine engine 14 as shown in FIGS. 1 and 2. The gas turbine engine 14 includes a fan 18 and an engine core 20 having a compressor, a combustor, and a turbine arranged axially along an axis 12 as shown in FIG. 2. The fan 18 is configured to be driven by the engine core 20 to provide thrust for propelling an aircraft. The exhaust nozzle 16 is coupled to the gas turbine engine 14 to release an exhaust flow 22 from the gas turbine engine 14. The exhaust system 16 has a variable nozzle throat area 42 that can be changed to optimize the exhaust flow 22 for low noise emissions such as, for example, during take-off and landing, or for increased engine efficiency, for example, at cruise.

Figure 3:
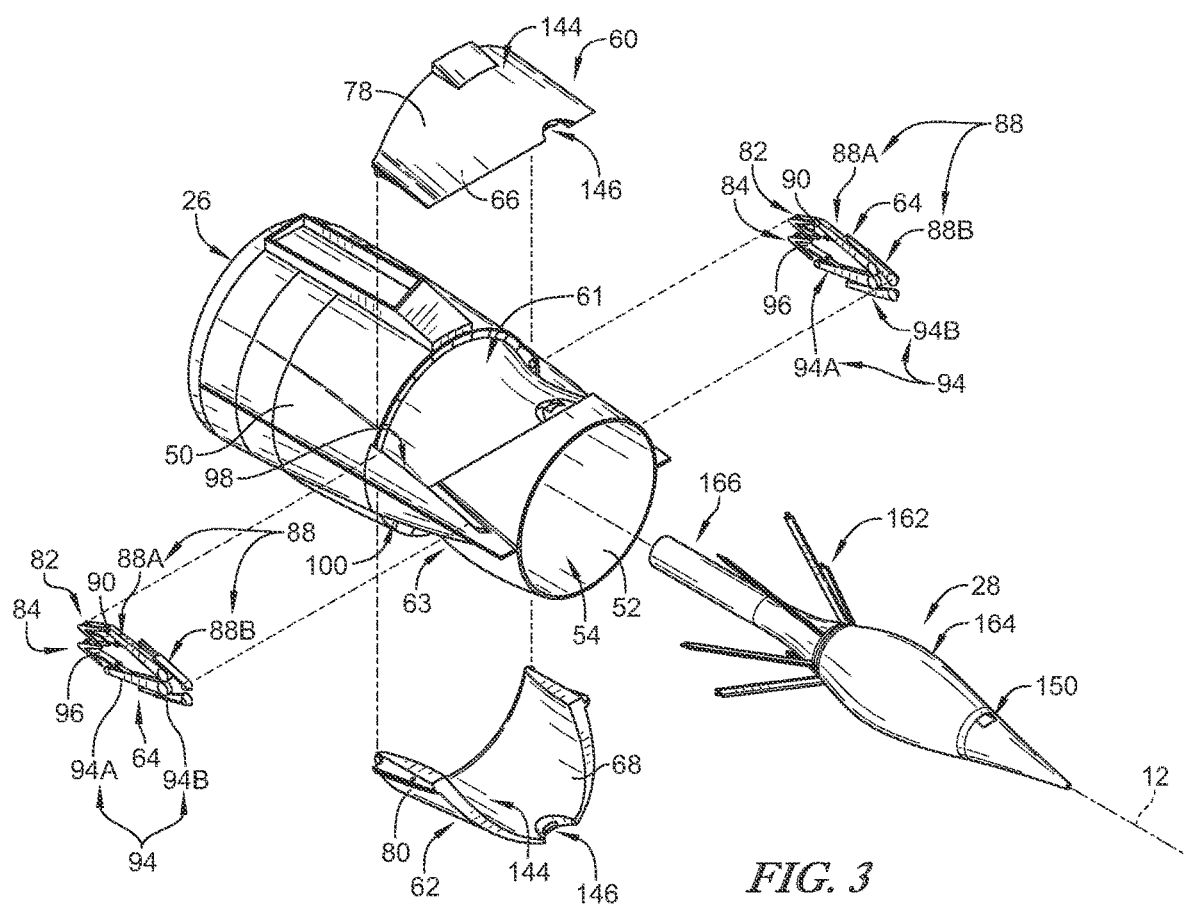
FIG. 3 is an exploded assembly view of the exhaust nozzle from FIG. 2 showing that the thrust reverser includes a first thrust reverse panel, a second thrust reverse panel, and an actuator system configured to attach the thrust reverse panels to the outer nozzle case and move the thrust reverse panels between various configurations.
Figure 4:
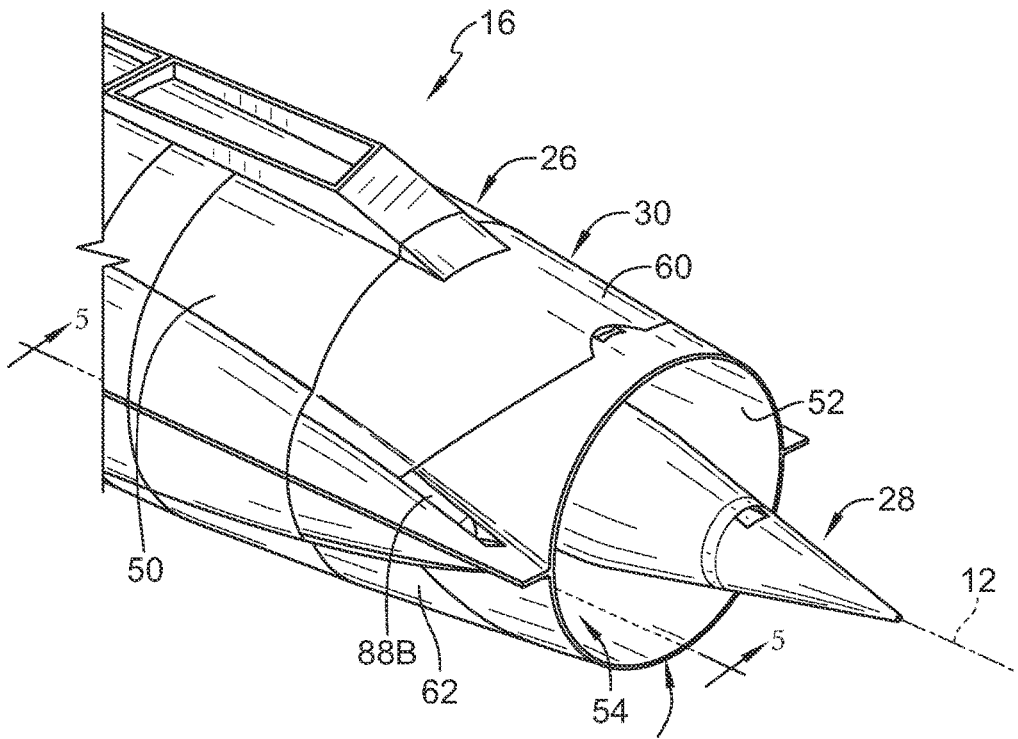
FIG. 4 is a perspective view of the exhaust nozzle showing the thrust reverser in a stored configuration in which the thrust reverser panels engage the outer nozzle case and cooperate with the outer nozzle case to provide an exterior surface of the exhaust nozzle.
Figure 5:
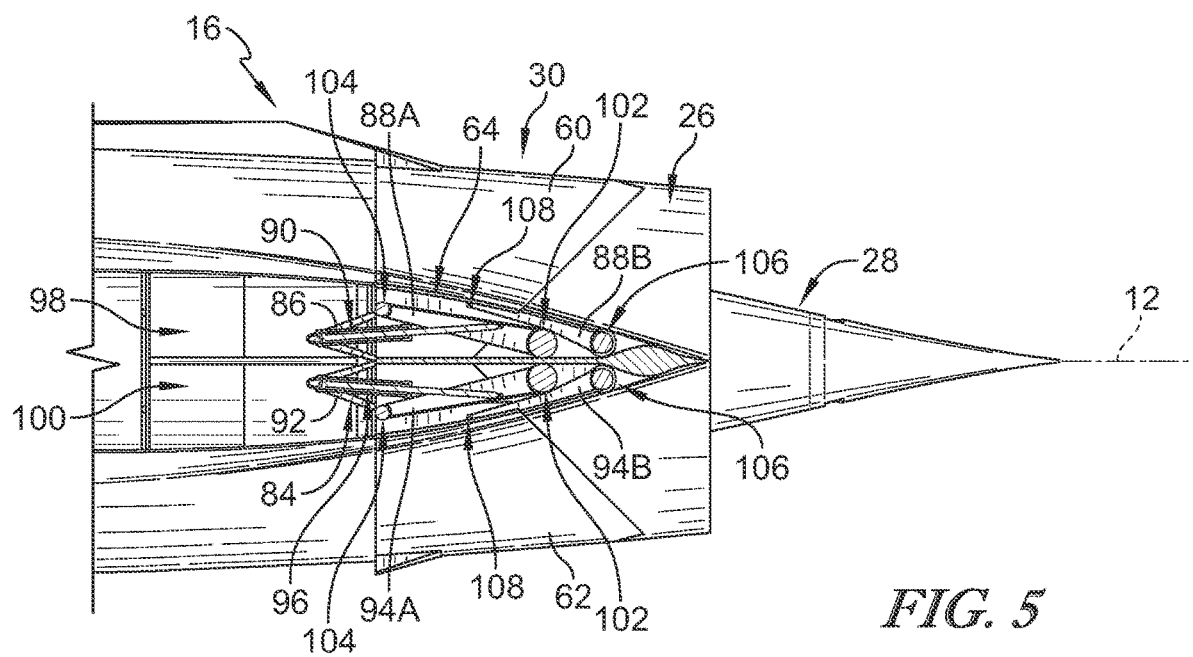
FIG. 5 is a cross sectional view taken along line 5-5 in FIG. 4 showing that the actuator system includes first and second actuators that cooperate to lock the first and second thrust reverse panels in the stored configuration when the first and second actuators are in a retracted state.
Figure 6:
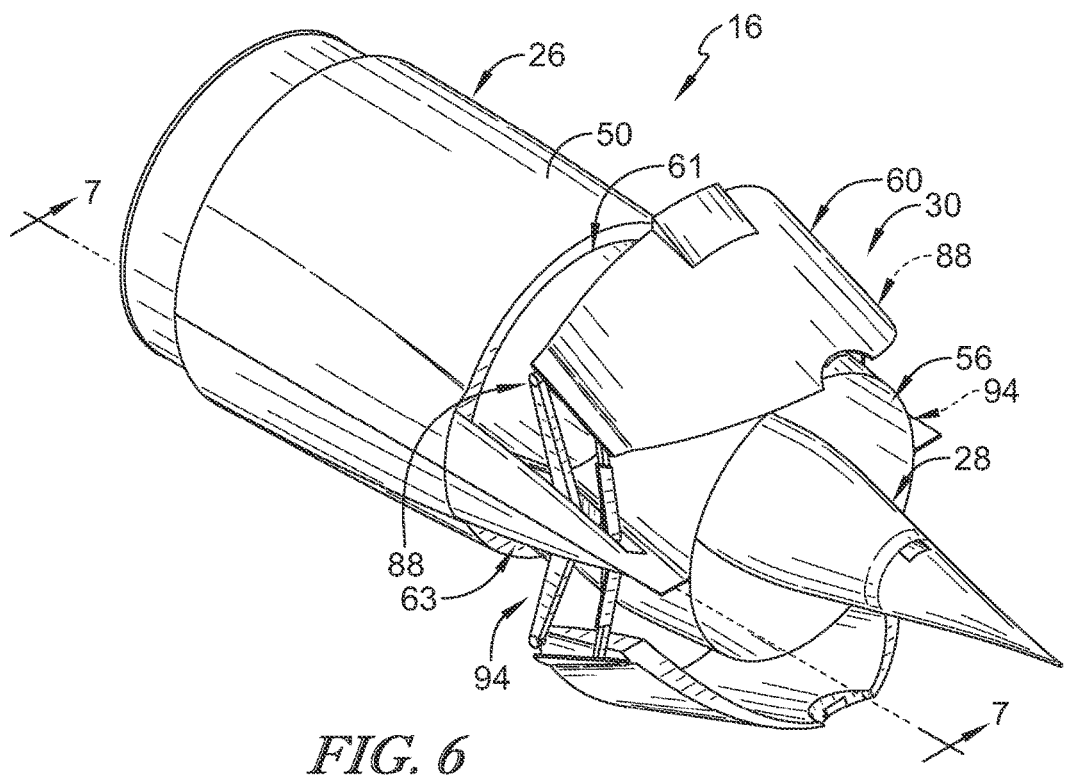
FIG. 6 is a perspective view of the exhaust nozzle showing the thrust reverser in a noise-reduction configuration in which first and second actuators lock and hold the first and second thrust reverse panels in spaced apart relation to the outer nozzle case and the inner plug to expose first and second ambient-air passages which direct ambient air inwardly toward the exhaust air exiting the outlet thereby reducing noise.
Figure 7:
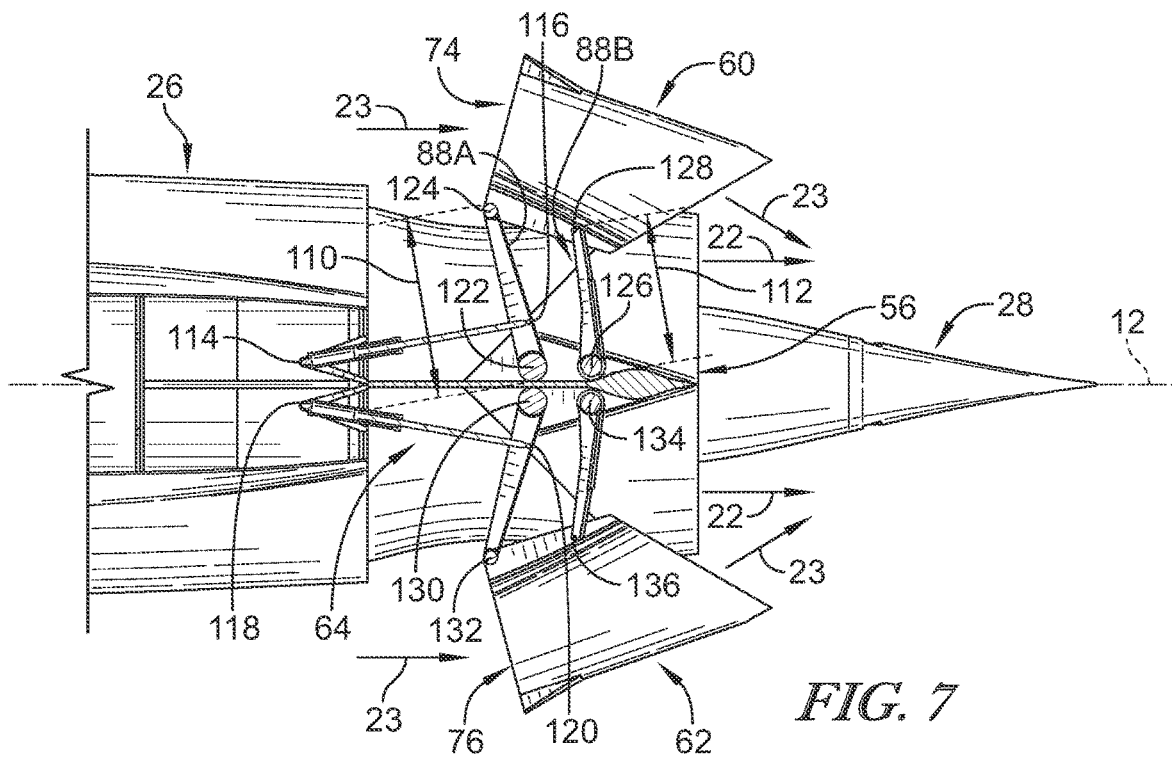
FIG. 7 is a cross sectional view taken along line 7-7 in FIG. 6 showing the first and second actuators holding the first and second thrust reverse panels in the noise-reduction configuration.
Figure 8:
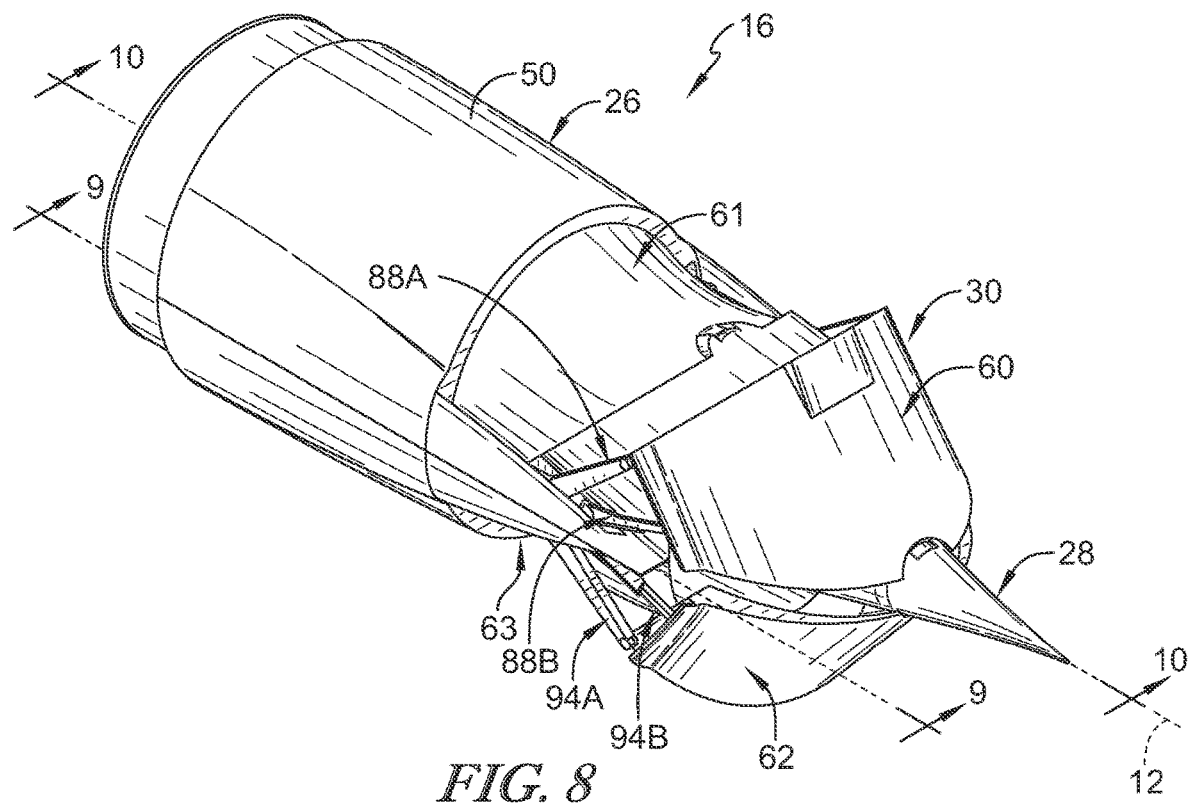
FIG. 8 is a perspective view of the exhaust nozzle showing the thrust reverser in a reverse-thrust configuration in which the first and second thrust reverse panels engage the nozzle plug downstream of the outlet to redirect the exhaust air exiting the outlet in the forward direction for reverse thrust.
Figure 9:
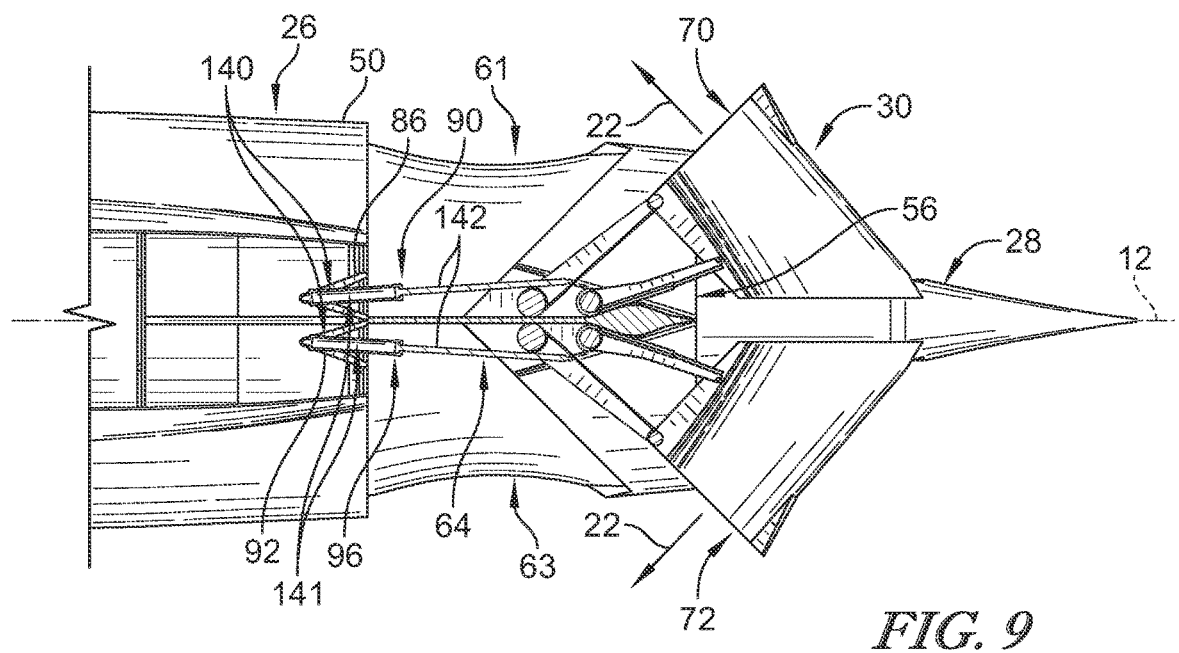
FIG. 9 is a cross sectional view taken along line 9-9 showing the first and second thrust reverse panels in the reverse-thrust configuration redirecting exhaust air in the forward direction and radially outward away from the central axis.

The exhaust nozzle 16 includes a static, outer nozzle case 26, a nozzle plug 28, and a thrust reverser 30 as shown FIGS. 2-7. The outer nozzle case 26 is fixed relative to the gas turbine engine 14. The outer nozzle case 26 defines an outer boundary surface of the variable nozzle throat area 42 of the exhaust nozzle 16. The nozzle plug 28 defines an inner boundary surface of the variable nozzle throat area 42. At least a portion of the nozzle plug 28 is mounted for movement along the axis 12 to control the size and shape of the variable nozzle throat area 42 of the exhaust nozzle 16 depending on the flight configuration of the gas turbine engine or other flight conditions. The thrust reverser 30 is integrated into the outer nozzle case 26 and is configured to move relative to the outer nozzle case 26 and the nozzle plug 28 between a stored configuration as shown in FIGS. 4 and 5, a reverse-thrust configuration as shown in FIGS. 8 and 9, and a noise-reduction configuration, as shown in FIGS. 6 and 7.

The outer nozzle case 26 is formed to extend circumferentially around the central axis 12 and has an outer surface 50 facing away from the central axis 12 and an opposite, inner surface 52 facing toward the central axis 12 as shown in FIGS. 1 and 3. The inner surface 52 defines an interior space 54 radially inwardly from the inner surface 52. The outer surface 50 partially forms an exterior surface of the exhaust nozzle 14 that interacts with ambient air.

The nozzle plug 28 is located at least partially within the interior space 54 and along the central axis 12 and cooperates with the outer nozzle case to provide the variable throat area 42 as shown in FIGS. 1-3. The nozzle plug 28 is configured to interact with hot exhaust gases 22 flowing through the interior space 54 in an aft direction 32 to guide the hot exhaust gases 22 out of the interior space 54 through an exhaust outlet 56 at an aft end of the outer nozzle case 26.

The thrust reverser 30 is coupled to the outer nozzle case 26 and is configured to redirect the hot exhaust gases 22 to provide reverse thrust in a forward direction 34 opposite the aft direction 32 when the thrust reverser 30 is in the reverse-thrust configuration. The thrust reverser 30 includes a first thrust reverser panel 60 coupled to the outer nozzle case 26, a second thrust reverser panel 62 coupled to the outer nozzle case 26 and located on an opposite side of the outer nozzle case 26 from the first thrust reverser panel 60, and an actuator system 64 coupled with the first and second thrust reverser panels 60, 62. The actuator system 64 is configured to move the first and second thrust reverser panels 60, 62 between the stored configuration, the reverse-thrust configuration, and the noise-reduction configuration by pivoting and translating the first and second thrust reverser panels 60, 62 relative to the outer nozzle case 26.

In the stored configuration, the first and second thrust reverser panels 60, 62 are in contact with the outer surface 50 of the outer nozzle case 26 to provide an aerodynamic profile of the exhaust nozzle 16 for normal flight conditions. The first and second thrust reverser panels 60, 62 are configured to reside within respective first and second panel-receiving indentations 61, 63 formed in the outer nozzle case 26 as shown in FIG. 2. In this way, both of the thrust reverser panels 60, 62 form a part of the exterior surface of the exhaust nozzle 16 in the stored configuration. Each panel-receiving indentation 61, 63 extends less than 50% around the central axis 12.

In the reverse-thrust configuration, the first and second thrust reverser panels 60, 62 are spaced apart from the outer surface 50 of the outer nozzle case 26 and engage the nozzle plug 28 aft of the exhaust outlet 56 as shown in FIGS. 8 and 9. In the reverse-thrust configuration, the first and second thrust reverser panels 60, 62 direct at least a portion of the hot exhaust air 22 exiting the exhaust outlet 56 in the forward direction and radially outward away from the central axis 12 through first and second reverse thrust passageways 70, 72 defined between the nozzle plug 28 and an inner surface 66, 68 of the first and second thrust reverser panels 60, 62, respectively.

In the intermediate, noise-reduction configuration between the stored configuration and the reverse-thrust configuration, the first and second thrust reverser panels 60, 62 are locked in spaced apart relation to the outer nozzle case 26 and the nozzle plug 28. In the noise-reduction configuration, the first and second thrust reverser panels 60, 62 direct ambient air 23 in the aft direction and radially inward toward the hot exhaust air 22 exiting the exhaust outlet 56 through first and second cold-air passages 74, 76 defined between the outer surface of the outer nozzle case 26 and the inner surface 66, 68 of the first and second thrust reverser panels 60, 62, respectively, to reduce noise produced by the hot exhaust gases 22 exiting the exhaust outlet 56.

The first and second thrust reverser panels 60, 62 each have outer surfaces 78, 80 that provide a portion of the exterior surface of the exhaust nozzle 16 in the stored configuration. The outer surfaces 78, 80 of the first and second thrust reverser panels 60, 62 are flush with portions of the outer surface 50 of the outer nozzle case 26 that reside immediately adjacent to each of the thrust reverser panels 60, 62 in the stored configuration. This provides a smooth transition between the outer surface 50 of the outer nozzle case 26 and the outer surfaces 78, 80 of the thrust reverser panels 60, 62 to improve aerodynamics of the propulsion unit 10.

One or more portions of the actuator system 64 may also provide an exterior surface of the exhaust nozzle 16 in the stored configuration to minimize a footprint of the exhaust nozzle 16 while maintaining good aerodynamics. The actuator system 64 includes a first actuator 82 coupled to the first thrust reverser panel 60 and a second actuator 84 coupled to the second thrust reverser panel 62. Each actuator 82, 84 is configured to move a respective thrust reverser panel 60, 62 between the stored configuration, the reverse-thrust configuration, and the noise reduction configuration.

The first actuator 82 includes a first actuator mount 86 fixed to the outer nozzle case 26, a first plurality of panel links 88 coupled between the outer nozzle case 26 and the first thrust reverser panel 60, and a first link mover 90 extending between the first actuator mount 86 and at least one link included in the first plurality of panel links 88. The second actuator 84 includes a second actuator mount 92 fixed to the outer nozzle case 26, a second plurality of panel links 94 coupled between the outer nozzle case 26 and the second thrust reverser panel 62, and a second link mover 96 extending between the second actuator mount 92 and at least one link included in the second plurality of panel links 94. In the illustrative embodiment, each actuator 82, 84 includes two sets of actuator mounts 86, 92, links 88, 94, and link movers 90, 96 with each respective set being mounted on diametrically opposite sides of the exhaust nozzle from one another. Each set is substantially similar, so only one set of actuator mounts 86, 92, links 88, 94, and link movers 90, 96 is described herein.

The outer nozzle case 26 is formed to include actuator cavities 98, 100 between the outer and inner surfaces 50, 52 of the outer nozzle case as shown in FIGS. 3-9. The first and second actuator mounts 86, 92 are fixed to the outer nozzle case 26 and are located within a respective cavity 98, 100 between the outer surface 50 of the outer nozzle case 26 and the inner surface 52 of the outer nozzle case 26. In the stored configuration, the actuator mounts 86, 92 and the link movers 90, 96 are located entirely within a respective cavity 98, 100. At least a portion of one of the links 88, 94 is configured to form a portion of the exterior surface of the exhaust nozzle 16 in the stored configuration.

The first and second plurality of panel links 88, 94 each include a forward panel link 88A, 94A and an aft panel link 88B, 94B as shown in FIGS. 3-9. Each forward panel link 88A, 94A has a first end 102 coupled to the outer nozzle case 26 and an opposite, second end 104 coupled to a respective one of the first and second thrust reverser panels 60, 62. Each aft panel link 88B, 94B has a first end 106 coupled to the outer nozzle case and an opposite, second end 108 coupled to the respective one of the first and second thrust reverser panels 60, 62. The first end 102, 106 of each forward and aft panel link 88, 94 remains fixed relative to the outer nozzle case 26 but allows rotation of the links 88, 94 as the thrust reverser panels 60, 62 change between the different configurations. The second end 108 of the aft panel links 88B, 94B are located aft of the second end 104 of each respective forward panel link 88A, 94A in the stored configuration, the reverse-thrust configuration, and the noise-reduction configuration.

Each forward panel link 88A, 94A has a first length 110 and each aft panel link 88B, 94B has a second length 112 less than the first length 110 as shown in FIG. 7. The lengths 110, 112 of the links 88, 94 set the orientation of the first and second thrust reverser panels 60, 62 relative to the outer nozzle case 26 to cause the first and second thrust reverser panels 60, 62 to interact with the exhaust gas 22 and provide reverse thrust in the reverse-thrust configuration. The lengths 110, 112 of the links 88, 94 also set the orientation of the first and second thrust reverser panels 60, 62 relative to the outer nozzle case 26 to cause the first and second thrust reverser panels 60, 62 to interact with the ambient air 23 and provide reduced noise in the noise-reduction configuration. The lengths 110, 112 of the links 88, 94 do not change regardless of the configuration the thrust reverser panels 60, 62 are in.

The first link mover 90 is coupled to the first actuator mount 86 for pivotable movement about a first mover pivot axis 114 and is coupled to the forward panel link 88A of the first plurality of panel links 88 for pivotable movement about a second mover pivot axis 116 as shown in FIG. 7. The second link mover 96 is coupled to the second actuator mount 92 for pivotable movement about a third mover pivot axis 118 and is coupled to the forward panel link 94A of the second plurality of panel links 94 for pivotable movement about a fourth mover pivot axis 120. Any suitable bearing can be used to provide the axes 114, 116, 118, 120 such as a plain bearing, a roller bearing, a ball bearing, a fluid bearing, etc.

Each of the panel links 88, 94 are also mounted to the outer nozzle case 26 and to each respective thrust reverser panel 60, 62 for pivotable movement. The forward panel link 88A of the first plurality of panel links 88 is mounted to the outer nozzle case 26 for pivotable movement about a first forward-link pivot axis 122 and is coupled to the first thrust reverser panel 60 for pivotable movement about a second forward-link pivot axis 124. The aft panel link 88B of the first plurality of panel links 88 is mounted to the outer nozzle case 26 for pivotable movement about a first aft-link pivot axis 126 and is coupled to the first thrust reverser panel 60 for pivotable movement about a second aft-link pivot axis 128. In the illustrative embodiment, the second forward-link pivot axis 124 is aligned horizontally with the second aft-link pivot axis 128.

The forward panel link 94A of the second plurality of panel links 94 is mounted to the outer nozzle case 26 for pivotable movement about a third forward-link pivot axis 130 and is coupled to the second thrust reverser panel 62 for pivotable movement about a fourth forward-link pivot axis 132. The aft panel link 94B of the second plurality of panel links 94 is mounted to the outer nozzle case 26 for pivotable movement about a third aft-link pivot axis 134 and is coupled to the second thrust reverser panel 62 for pivotable movement about a fourth aft-link pivot axis 136. In the illustrative embodiment, the third forward-link pivot axis 130 is aligned horizontally with the third aft-link pivot axis 134.

The lengths 112, 114 of the links 88, 94 cause the thrust reverser panels 60, 62 to pivot relative to the outer nozzle case in a predetermined manner. In the stored configuration, the thrust reverser panels 60, 62 are oriented relative to the outer nozzle case 26 to have a first inward slope toward the central axis 12. In the noise-reduction configuration, the thrust reverser panels 60, 62 are oriented relative to the outer nozzle case 26 to have a second inward slope toward the central axis 12, greater than the first inward slope. In the reverse-thrust configuration, the thrust reverser panels 60, 62 are oriented relative to the outer nozzle case 26 to have a third inward slope toward the central axis 12, greater than the first and second inward slopes.

The first and second link movers 90, 96 each include a sheath 140 coupled to each respective actuator mount 86, 92 and formed to include a piston-receiving space 141 and a piston 142 coupled to each respective forward panel link 88A, 94A as shown in FIG. 9. The piston 142 is configured to extend and retract from the sheath 140 in the piston-receiving space 141 to move each respective thrust reverser panel 60, 62 between the stored configuration, the reverse-thrust configuration, and the noise-reduction configuration. The piston 142 may be hydraulically actuated in the illustrative embodiment.

Figure 10:
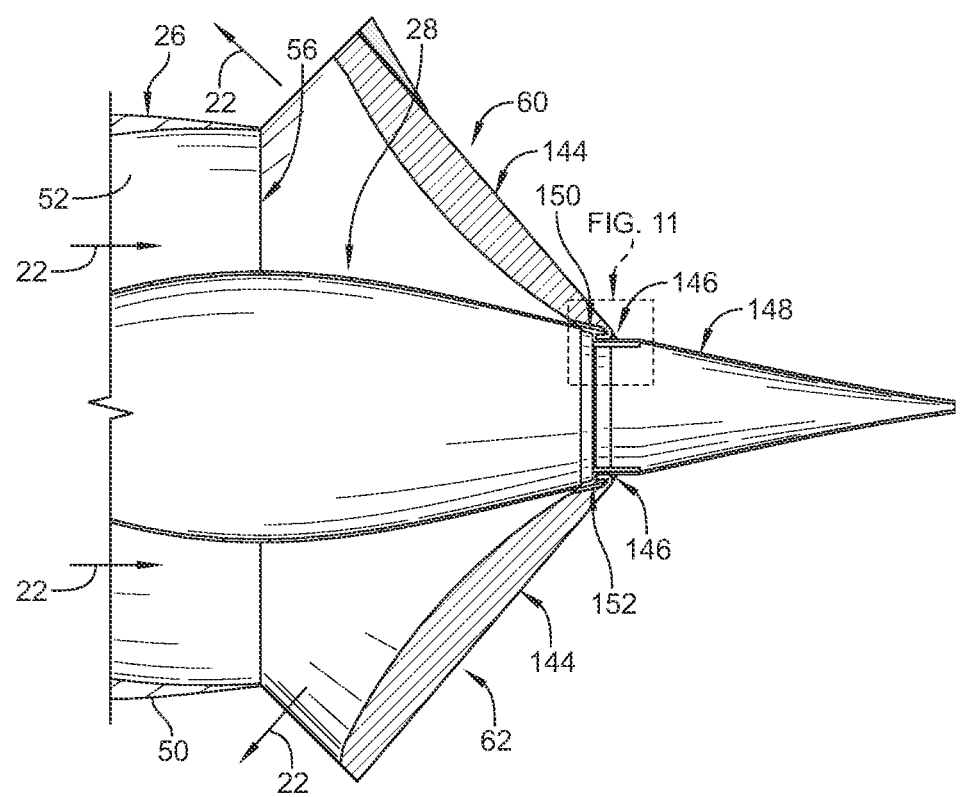
FIG. 10 is a cross sectional view taken along line 10-10 in FIG. 8 showing that each of the thrust reverser panels include panel retainers that latch on to respective panel catches formed on the nozzle plug to retain the thrust reverse panels in the reverse-thrust configuration without any assistance from the actuator system.
Figure 11:
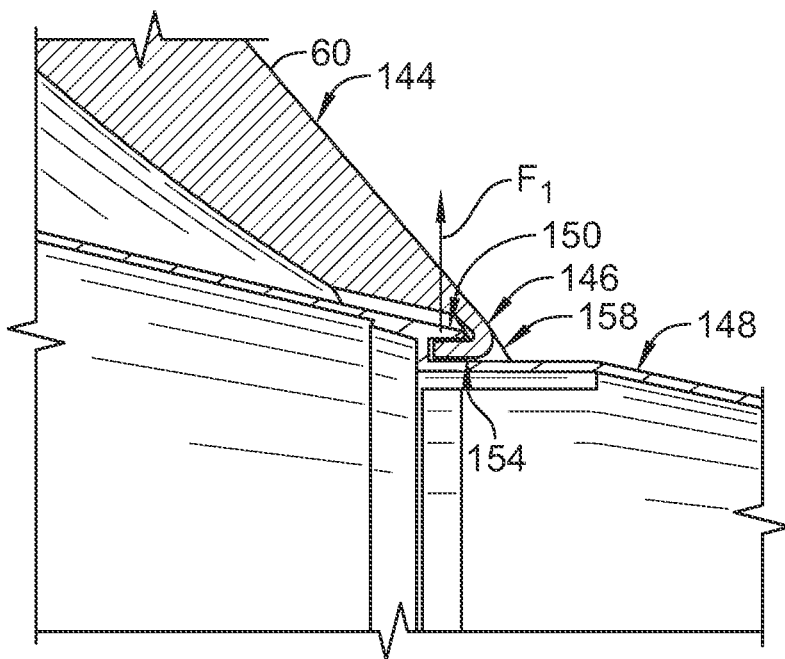
FIG. 11 is an enlarged view of a portion of FIG. 10 showing one of the panel retainers latched with one of the panel catches.

The first and second thrust reverser panels 60, 62 each include a panel body 144 and a panel retainer 146 coupled to an aft end of the panel body 144 as shown in FIGS. 10 and 11. The panel retainer 146 of the first and second thrust reverser panels 60, 62 are configured to engage the nozzle plug 28 in the reverse-thrust configuration to block movement of the first and second thrust reverser panels 60, 62 toward the stored configuration.

The nozzle plug 28 includes a plug body 148, a first panel catch 150 coupled to a first side of the plug body 148, and a second panel catch 152 coupled to an opposite second side of the plug body 148 as shown in FIGS. 10 and 11. The first panel catch 150 is configured to engage the panel retainer 146 of the first thrust reverser panel 60 in the reverse-thrust configuration to block movement of the first thrust reverser panel 60 toward the stored configuration. The second panel catch 152 is configured to engage the panel retainer 146 of the second thrust reverser panel 62 in the reverse-thrust configuration to block movement of the second thrust reverser panel 62 toward the stored configuration. Once each thrust reverser panel 60, 62 is latched to the panel catches 150, 152, the link movers 90, 96 can be relaxed or deactivated such that no force is provided by the link movers 90, 96 on the plurality of links 88, 94. The thrust reverse panels 60, 62 can be held in the reverse-thrust configuration solely by the panel catches 150, 152.

In the illustrative embodiment shown in FIG. 11, the panel catches 150, 152 each include a horizontally-extending flange that extends in the aft direction and is spaced apart from a portion of the plug body 148 to provide a retainer space 154 radially therebetween. Each of the panel retainers 146 has a complementary shape to fit within the retainer space 154. When latched in place, interaction between the panel retainers 146 and each respective panel catch 150, 152 resists a radial force F1 that extends away from the central axis 12 to block movement of the panel retainers 146 radially away from the nozzle plug 28 due to forces exerted on the panels 60, 62 by the exhaust gas 22.

Figure 12:
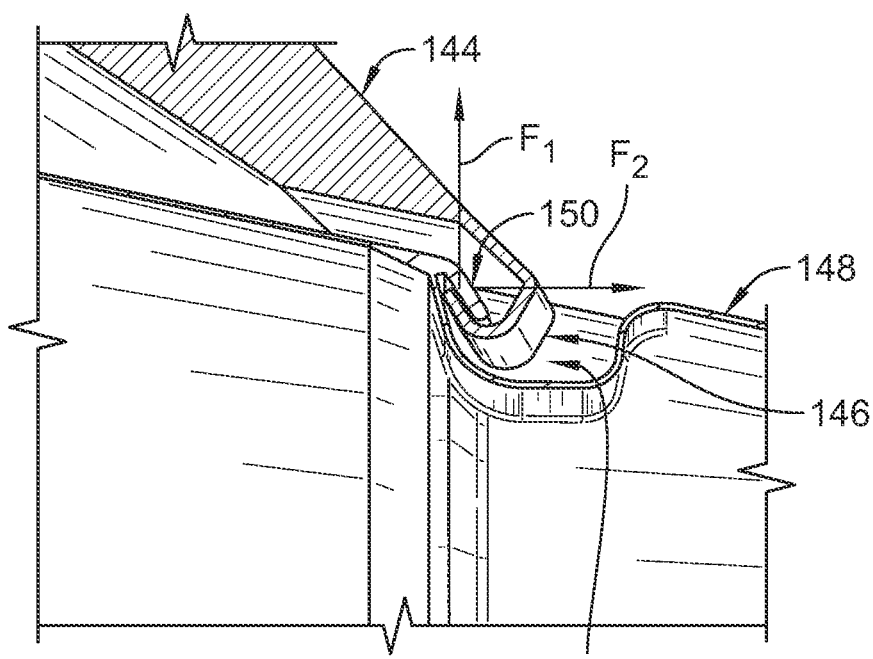
FIG. 12 is an enlarged view of a similar panel retainer and panel catch that can be used with the exhaust nozzle.

In some embodiments, the panel catches 150, 152 can extend inwardly toward the central axis 11 at an angle as shown in FIG. 12. The panel retainers 146 can be formed to match this shape so that, interaction between the panel retainers 146 and each respective panel catch 150, 152 resists the radial force $F_1$ and an axial force $F_2$.

For supersonic speed aircrafts, government or jurisdictional regulations may limit an amount of noise produced by gas turbine engines such as during take-off and landing when aircraft are lower to ground. These noise regulations may be dependent of the weight of the aircraft and not the size of the engine. For example, a lighter aircraft that is designed to travel at supersonic speeds may need to control the noise produced by the engine 14 at take-off to meet the noise regulations, but also be able to increase the acceleration of exhaust products at cruise to reach supersonic speeds.

Figure 14:
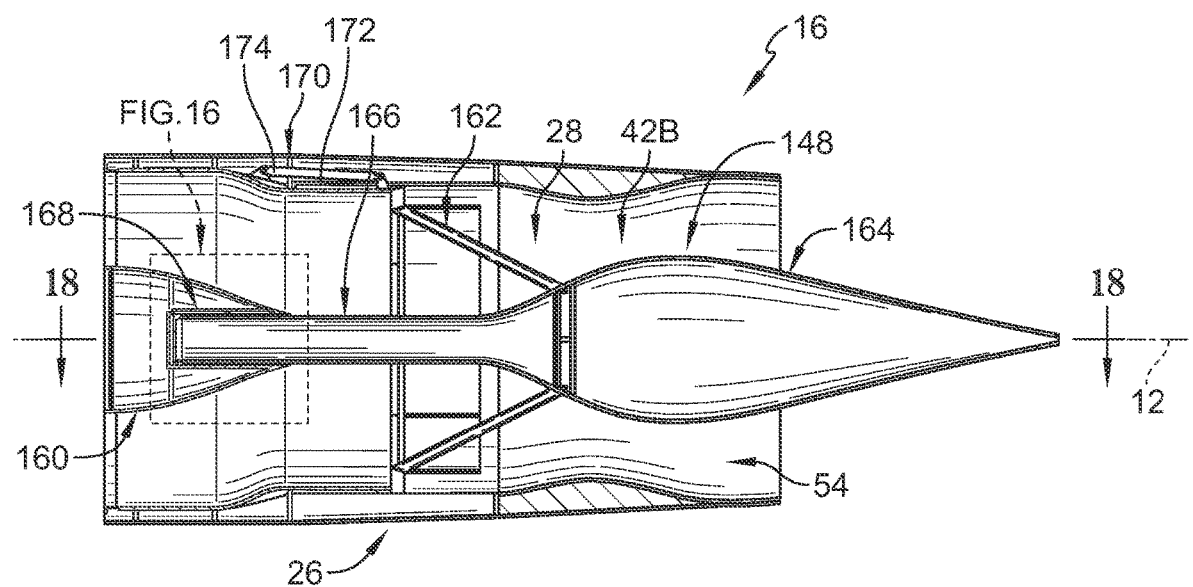
FIG. 14 is a cross sectional view showing the nozzle plug in a slid-forward position.
Figure 15:
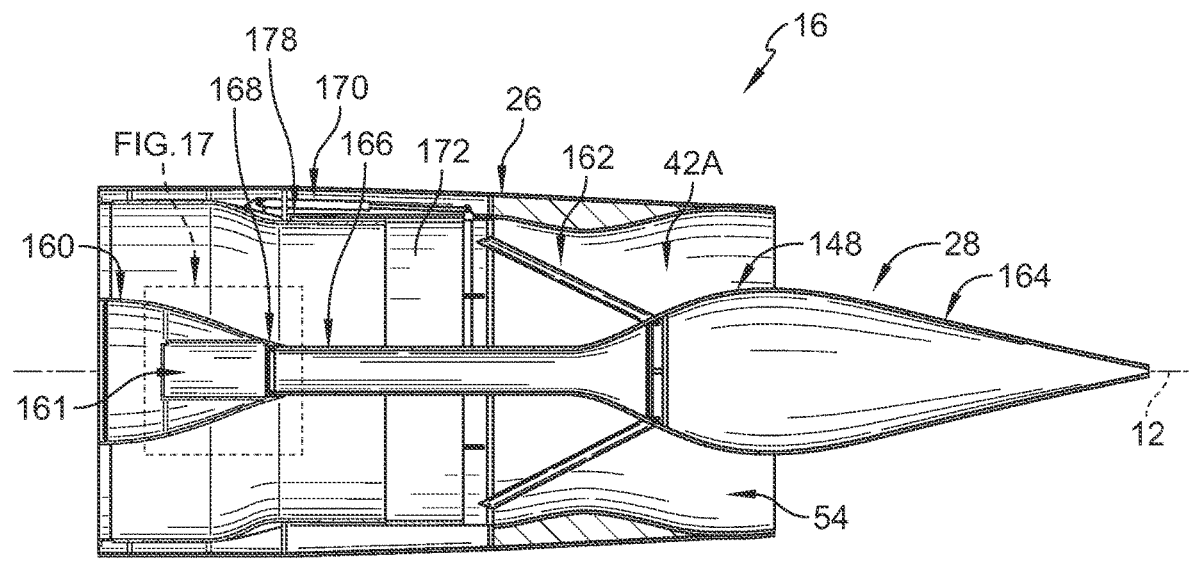
FIG. 15 is a cross sectional view showing the nozzle plug in a slid-back position.

To control the noise produced by the engine 14 at different points of a flight cycle of the aircraft, the nozzle plug 28 is configured to translate axially relative to the outer nozzle case 26 between a slid-back take-off position as shown in FIG. 15 and a slid-forward cruise position as shown in FIG. 14. In this way, the outer nozzle case 26 and the nozzle plug 28 together provide a reconfigurable exhaust nozzle 40. The reconfigurable exhaust nozzle 40 adjusts the variable nozzle throat area 42 of the exhaust system 16 to control noise produced by the gas turbine engine 14 during operation of the gas turbine engine 14 at different points of the flight cycle of the aircraft 10 such as take-off, and landing.

When the moveable exhaust outlet 44 is in the slid-back take-off position, the inner surface 52 of the outer nozzle case and the nozzle plug 28 are arranged to provide a convergent nozzle shape with a maximum nozzle throat area 42A as shown in FIG. 15. The maximum nozzle throat area 42A allows for a higher mass flow of exhaust products at a lower speed through the reconfigurable exhaust nozzle 40, which results in lower noise emissions. The lower noise emissions may be helpful for meeting certain noise requirements for ground-level and low-flight level operation such as take-off and landing. As one example, the noise requirements may be related to certain zones around airports such as residential areas. An increased throat area can increase propulsion system efficiency in subsonic or transonic operation where inlet spillage or interactions with other aircraft structures would increase drag. The thrust reverse panels 60, 62 can be deployed to the noise-reduction configuration to direct ambient air 23 inwardly toward the exhaust air 22 exiting the outlet 56 to further decrease noise.

When the moveable exhaust outlet 44 is in the slid-forward cruise position, the inner surface 52 of the outer nozzle case and the nozzle plug 28 are arranged to provide a convergent-divergent nozzle shape with a minimum nozzle throat area 42B as shown in FIG. 14. The minimum nozzle throat area 42B allows for flow acceleration of the exhaust products and increased engine efficiency, for example, at aircraft speeds above Mach 1.0. The minimum nozzle throat area 42B may cause the reconfigurable exhaust nozzle 40 to generate noise at greater decibel levels as compared to the maximum nozzle throat area 42A. The thrust reverse panels 60, 62 may increase drag in the noise-reduction configuration. As such, the moveable exhaust outlet 40 may be in the slid-forward cruise position and the thrust reverse panels 60, 62 may be in the stored configuration at higher altitudes and/or outside of restricted noise zones.

Figure 13:
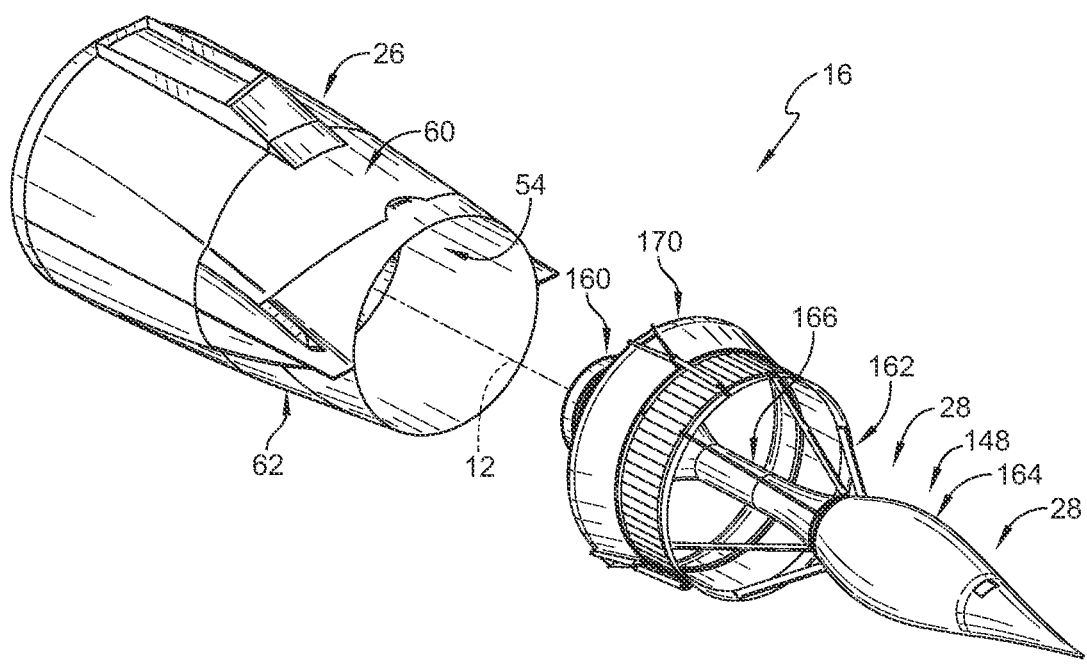
FIG. 13 is a partial exploded assembly view of the exhaust nozzle of FIG. 2 showing that the exhaust nozzle further includes a plug actuator configured to translate at least a portion of the nozzle plug forward and aft relative to the outer nozzle case.

The nozzle plug 28 is also axially translatable to facilitate latching of the panel retainers 146 with the panel catches 150, 152. As such, the exhaust nozzle 16 further includes a plug actuator 170 coupled with the outer nozzle case 26 and the movable plug body 148 as shown in FIGS. 13-15. The plug actuator 170 is configured to move the movable plug body 148 relative to the outer nozzle case 26 between the slid-forward position and the slid-back position, or any position between the slid-forward position and the slid-back position.

Prior to the thrust reverse panels 60, 62 reaching the reverse thrust configuration, the nozzle plug 28 may be slid slightly forward to align a retainer pocket 158 with a trajectory of both of the panel retainers 146. Once the panel retainers 146 clear the panel catches 150, 152 and extend into the retainer pockets 158, the nozzle plug 28 can be slid aft to lock the panel retainers 146 in place with the panel catches 150, 152. The nozzle plug 28 can then be slid forward slightly to free the panels 60, 62 to return to the noise-reduction configuration and the stored configuration.

The nozzle plug 28 further includes a stationary tailcone 160, the plug body 148, and a plurality of support struts 162 as shown in FIGS. 13-15. The stationary tailcone 160 is located within the interior space 54 upstream of the exhaust outlet 56. The plug body 148 extends in the aft direction away from the stationary tailcone along the central axis and is movable relative to the stationary tailcone 160. The plurality of support struts 162 are coupled to the movable plug body 148 and spaced circumferentially apart from one another around the central axis 12 to support the movable plug body 148 along the central axis 12. Each of the plurality of struts 162 extends inwardly toward the central axis 12 and aft away from the actuator 170.

The movable plug body 148 includes a plug tail 164 having a variable-diameter, a plug stem 166 coupled with a forward end of the plug tail and having a substantially constant diameter, and a plug guide 168 fixed to the plug stem 166 for movement therewith. The plug guide 168 is configured to engage the stationary tailcone 160 to block rotation of the movable plug body 148 relative to the stationary tailcone 160 about the central axis 12.

The stationary tailcone 160 is formed to include a stem-receiving space 161 located along the central axis 12 as shown in FIGS. 14 and 15. The plug stem 166 extends into the stem-receiving space 161 of the stationary tailcone 160. The movable plug body 148 is simply supported by both the stationary tailcone 160 and the plurality of support struts 162. The plug stem 166 extends into the stem-receiving space 161 in both the slid-forward position and the slid-back position.

Figure 16:
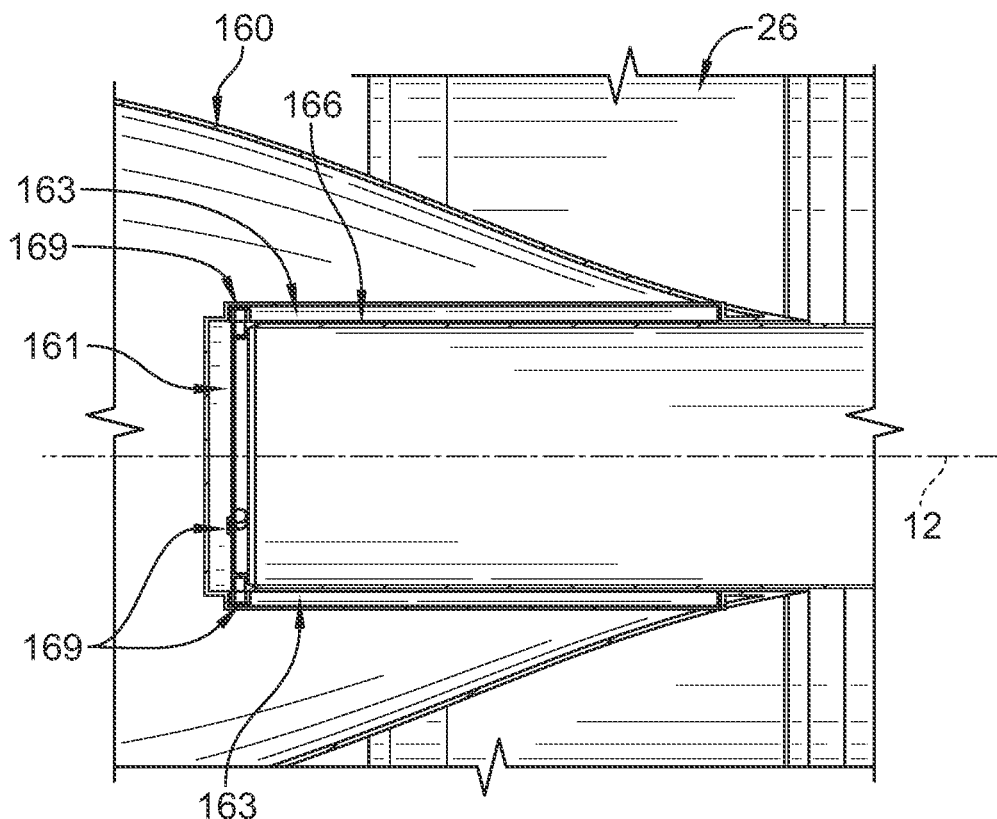
FIG. 16 is an enlarged view of a portion of FIG. 14 showing that the nozzle plug includes a stationary tailcone, a movable plug body received in a space formed in the stationary tailcone and a plurality of rollers protruding outwardly away from the movable plug body and into respective slots included in the space to guide movement of the movable plug body forward and aft and block rotation of the movable plug body about the central axis.
Figure 17:
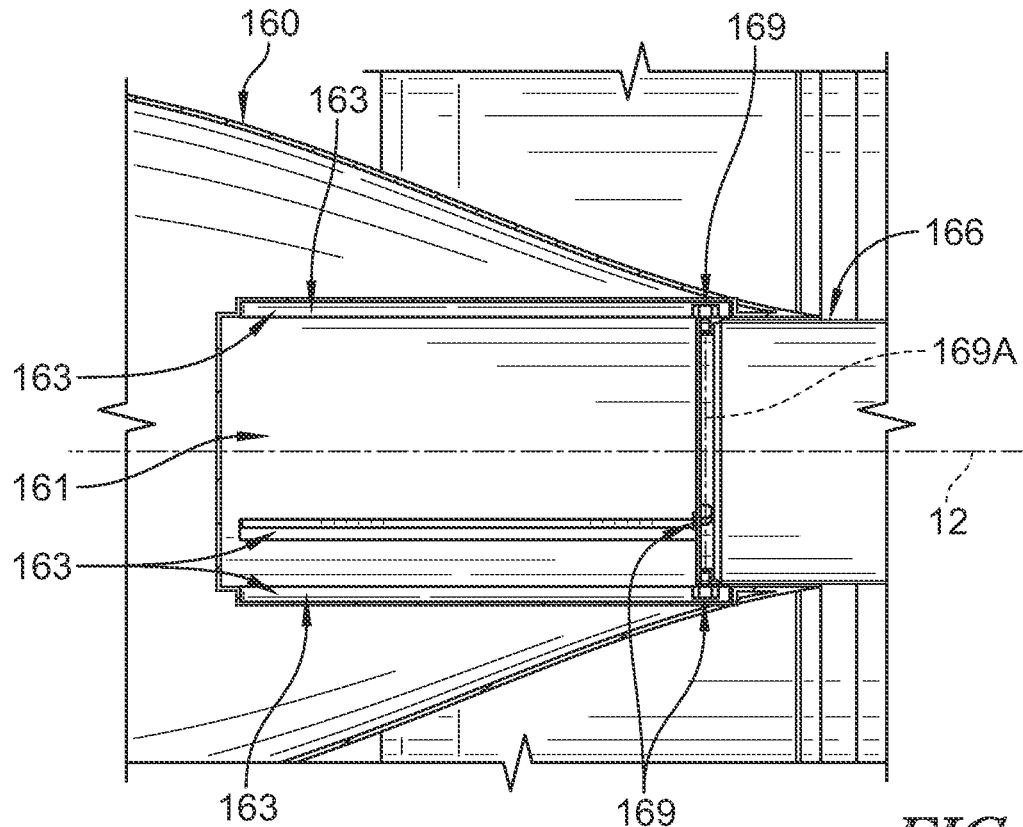
FIG. 17 is an enlarged view of a portion of FIG. 15 showing the movable plug body in the slid-back position to extend further out of the space formed in the stationary tailcone.

The plug guide 168 includes a plurality of rollers 169 spaced circumferentially around the central axis from one another and protruding radially outward from an outer surface of the plug stem 166 to engage with an interior surface defining the stem-receiving space 161 as shown in FIGS. 16 and 17. The stem-receiving space 161 includes a plurality of guide slots 163 spaced circumferentially apart from one another. Each roller 169 included in the plurality of rollers 169 is configured to extend into a respective guide slot 163 included in the plurality of guide slots 163. Each of the rollers 169 is configured to rotate about a roller axis 169A that extends through the central axis 12 and is perpendicular to the central axis 12. The rollers 169 are configured to travel through the slots 163 and rotate about each respective axis 169A as the plug actuator 170 moves the movable plug body 148 between the slid-forward position and the slid-back position.

Figure 18:
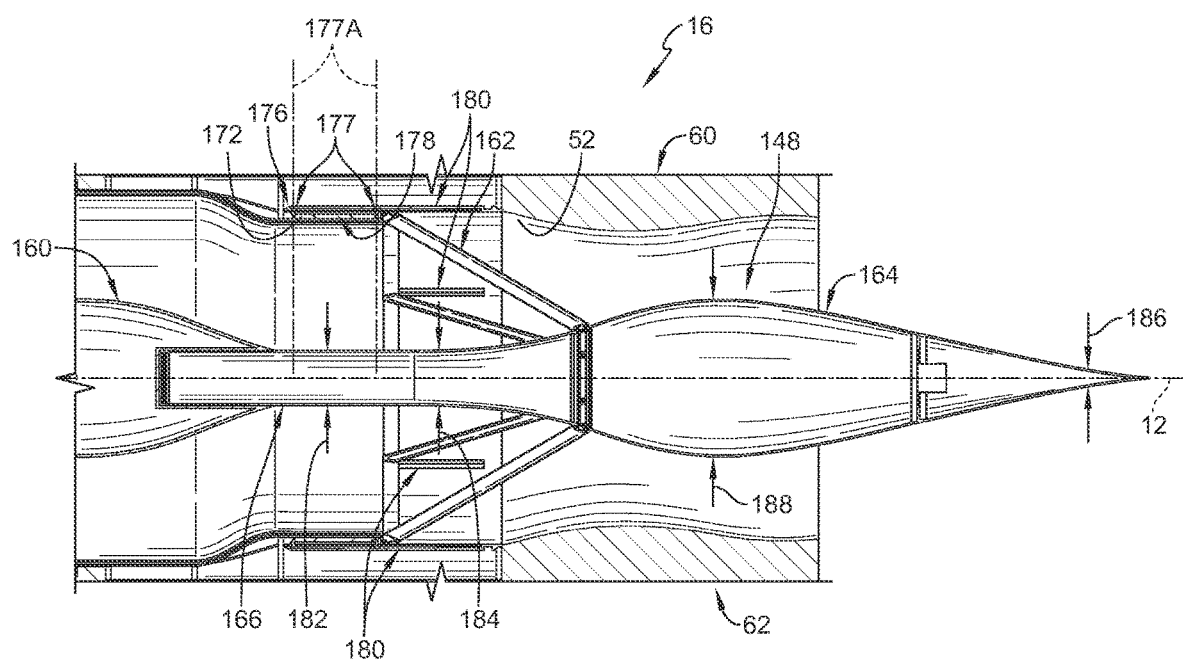
FIG. 18 is cross sectional view taken along line 18-18 in FIG. 14 showing that the plug actuator includes an actuator ring received in a cavity formed in the outer nozzle case, an actuator piston configured to move the actuator ring and each of the plurality of support struts forward and aft, and a plurality of rollers that protrude outwardly and into respective slots formed in the outer nozzle case to guide movement of the actuator ring forward and aft and block rotation of the movable plug body about the central axis.

The plug actuator 170 includes an actuator ring 172 coupled to each of the support struts 162, an actuator piston 174 coupled to the actuator ring 172 and the outer nozzle case 26, and a plurality of ring guides 176 coupled to the actuator ring 172 as shown in FIGS. 14, 15, and 18. The actuator ring 172 extends annularly around the central axis 12. The actuator piston 174 is configured to translate the actuator ring 172 forward and aft to move the plug body 148 and the plurality of support struts 162 between the slid-forward position and the slid-back position. The plurality of ring guides 176 are configured to guide movement of the actuator ring 172 relative to the outer nozzle case 26 and block rotation of the actuator ring 172 and the plurality of support struts 162 about the central axis 12.

The plurality of ring guides 176 includes a plurality of rollers 177 that engage the outer nozzle case 26 and roll along the outer nozzle case 26 as the actuator piston 174 moves the actuator ring 172 forward and aft. The outer nozzle case 26 is formed to include a ring cavity 178. The actuator ring 172 is at least partially received in the ring cavity 178 when the plug body 148 is in the slid-forward position. The actuator ring 172 extends from the ring cavity 178 to form a portion of an outer exhaust gas boundary with the inner surface 52 of the outer nozzle case 26 when the plug body 148 is in the slid-back position.

The outer nozzle case 26 is formed to include a plurality of slots that open radially inward into the ring cavity 178. Each of the rollers 177 is received in a respective slot included in the plurality of slots 180. Each of the struts included in the plurality of struts 162 is aligned circumferentially with at least one slot included in the plurality of slots 180. The plurality of rollers 177 includes a plurality of forward rollers and a plurality of aft rollers spaced apart from the plurality of forward rollers. Each of the struts included in the plurality of struts 162 is aligned circumferentially with at least one roller included in the plurality of rollers 177. Each of the rollers 177 is configured to rotate about a roller axis 177A that extends through the central axis 12 and that is perpendicular to the central axis 12.

The plug stem 166 has a first diameter 182 as shown in FIG. 18. The plug tail 164 has a second diameter 184, greater than the first diameter 182, at a first end of the plug tail 164 closest to the plug stem 166. The plug tail 164 has a third diameter 186, less than the first diameter 182 and the second diameter 184, at a second end of the plug tail 164 furthest from the plug stem 166. The plug tail 164 has a fourth diameter 188, greater than the first, second, and third diameters 182, 184, 186, axially between the first end and the second end of the plug tail 164.

Figure 19:
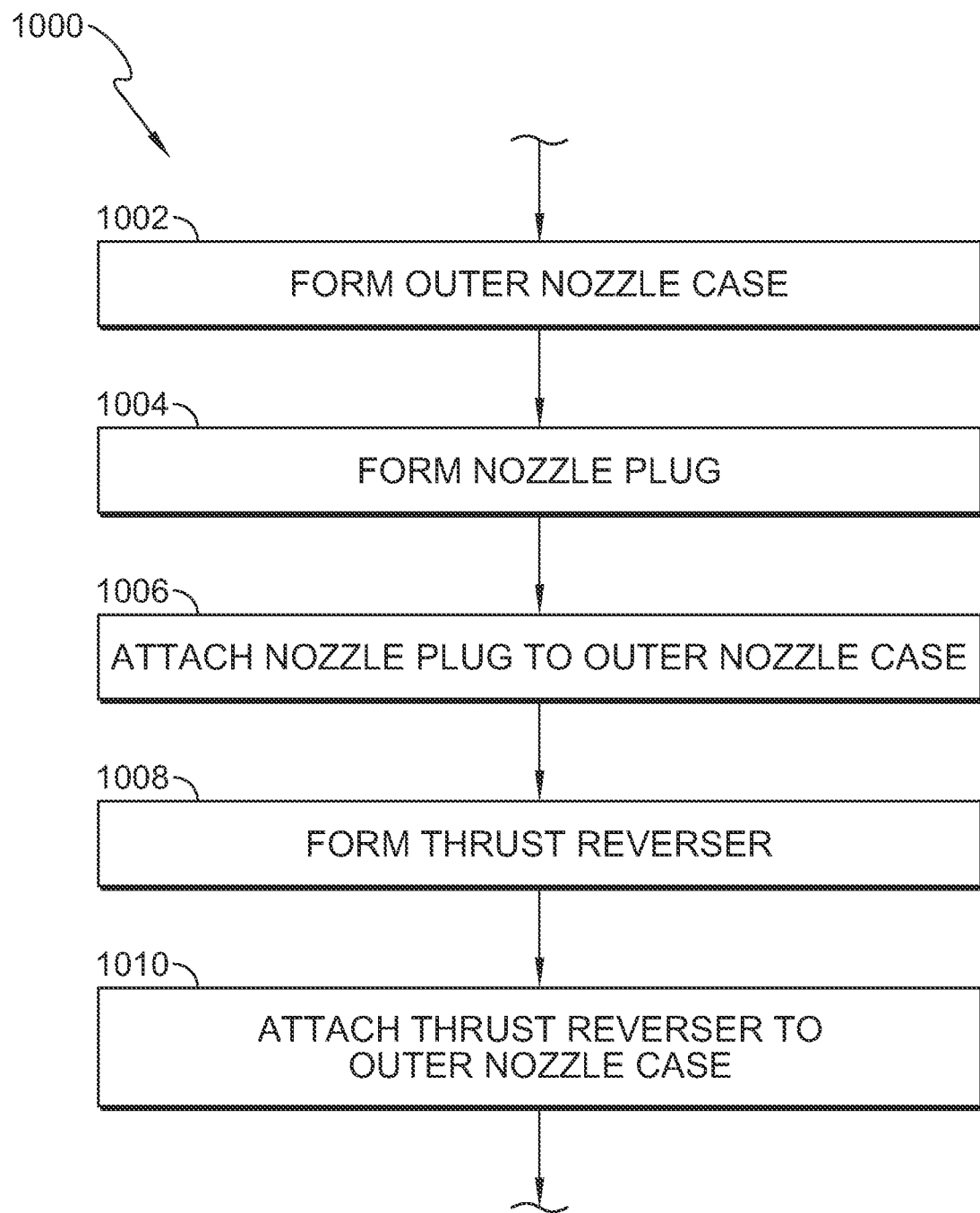
FIG. 19 is a flow chart showing a process by which the exhaust nozzle is manufactured.

The exhaust nozzle 16 is manufactured and installed on the gas turbine engine 14 according to a process 1000 as shown in FIG. 19. The process 1000 includes a step 1002 of forming the outer nozzle case 26. The outer nozzle case 26 can be formed in any shape or size, but the shape and size of the outer nozzle case 26 is used in subsequent steps of the process 1000 to form the thrust reverser 30. Forming the outer nozzle case 26 includes forming the first panel receiving indentation 61 into the outer surface 50 of the outer nozzle case 26 and forming the second panel-receiving indentation 63 into the outer surface 50 of the outer nozzle case 26.

The process 1000 further includes a step 1004 of forming the nozzle plug 28. The nozzle plug 28 can be formed in any shape or size, but the shape and size of the nozzle plug is used in subsequent steps of the process 1000 to form the thrust reverser. In some embodiments, the step 1004 of forming the nozzle plug 28 includes determining engine performance characteristics of the gas turbine engine 14 and sizing the nozzle plug 28 relative to the outer nozzle case 26 so that the exhaust nozzle 16 meets those engine performance characteristics.

The step 1004 of forming the nozzle plug 28 includes forming the stationary tailcone 160 and inserting the movable plug body 148 into the space 161 formed in an aft end of the stationary tailcone 160. In this way, the movable plug body 148 is translatable relative to the stationary tailcone 160 and the outer nozzle case 26 along the central axis 12 during use between the slid-back configuration and the slid-forward configuration.

The process 1000 further includes a step 1006 of attaching the nozzle plug 28 to at least one of the gas turbine engine 14 and the outer nozzle case 26 to reside within the interior space 54 and along the central axis 12. The step 1006 of attaching the nozzle plug 28 may include attaching the nozzle plug 28, or a portion thereof, to an aft end of the gas turbine engine 14 via the stationary tailcone 160 and/or to the outer nozzle case 26 via the plurality of support struts 162.

The process 1000 may further include a step 1008 of forming the thrust reverser 30. The thrust reverser 30 is formed with dimensions that allow the first thrust reverser panel 60 and the second thrust reverser panel 62 to change between the stored configuration, the reverse thrust configuration, and the noise-reduction configuration. The step 1008 may include sizing the outer nozzle case 26, the nozzle plug 28, or portions thereof to fit the thrust reverser 30. The step 1008 may include sizing and/or shaping the thrust reverse panels 60, 62 based on one or more performance criteria (i.e. a performance curve) of the gas turbine engine 14. The actuator system 64 may also be sized or shaped relative to the outer nozzle case 26, the nozzle plug 28 and the thrust reverse panels 60, 62 to ensure the panels 60, 62 are properly oriented in each configuration.

Once the thrust reverser 30 is formed, the process 1000 further includes a step 1010 of attaching the thrust reverser 30 to the outer nozzle case 26. The step 1010 includes of attaching the first and second thrust reverser panels 60, 62 to the outer nozzle case 26 includes placing the first thrust reverser panel in the first panel-receiving indentation 61 and placing the second thrust reverser panel in the second panel-receiving indentation 63. When the panels 60, 62 are received in the indentations 61, 63, the outer surface of both the first and second thrust reverser panels 60, 62 cooperate with the outer surface of the outer nozzle case to provide the exterior surface of the exhaust nozzle. The steps 1002 and 1008 of forming the outer nozzle case 26 and the thrust reverser 30 include sizing the outer nozzle case 26 and the thrust reverser 30 so that this is possible.

The step 1008 of forming the thrust reverser 30 includes forming the forward panel links 88A, 94A and the aft panel links 88B, 94B. The step 1010 includes attaching each of the panel links 88, 94 to the outer nozzle case 26 and to the first and second thrust reverser panels 60, 62 by bearings so that each panel link rotates about a respective pair of axes 122, 124, 126, 128, 130, 132, 134, 136 when moved by the actuator system 64 from the stored configuration to the reverse thrust configuration. The step 1010 further includes attaching the first link mover 90 to the outer nozzle case 26 and the first forward panel link 88A and attaching the second link mover 96 to the outer nozzle case 26 and the second forward panel link 94A via bearings to allow each link mover to rotate about a pair of axes 114, 116, 118, 120 as the link movers move from a retracted position to an extended position.

The step 1010 may further include sizing the first and second forward panel links 88A, 94A to have the first length 110 and sizing the first and second aft panel links 88B, 94B to have the second length 112 that is less than the first length 110. These dimensions cause the first and second thrust reverser panels 60, 62 to gradually increase inward slope toward the central axis as the first and second thrust reverser panels 60, 62 move from the stored configuration to the reverse-thrust configuration. The step 1010 further includes attaching a fixed end of the first forward and aft panel links 88A, 88B along an axial line extending parallel to the central axis 12.

The step 1008 may further include forming the inner surface 66, 68 of the first and second thrust reverser panels 60, 62 to have a convex shape relative to the central axis 12. The step 1002 of forming the outer nozzle case 26 may include forming a portion of the outer surface 50 of the outer nozzle case 26 defining the first and second panel-receiving indentations 61, 63 to have a concave shape that matches the convex shape of the first and second thrust reverser panels 60, 62. The step 1002 of forming the outer nozzle case includes forming the inner surface 52 of the outer nozzle case 26 to have a convex shape.

The step 1010 may further include aligning a portion of the actuator system 64 with the exterior surface of the exhaust nozzle such that the portion of the actuator system 64 cooperates with the outer nozzle case 26 and the first and second thrust reverser panels 60, 62 to define the exterior surface.

The step 1002 may further include forming the actuator cavities 98, 100 in the outer nozzle case and between the inner surface 52 and the outer surface 50 of the outer nozzle case. The step 1010 of attaching the thrust reverser 30 to the outer nozzle case 26 includes placing the first and second forward and aft panel links 88, 94 at least partially in the actuator cavities 98, 100.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An exhaust nozzle for a turbine engine, the exhaust nozzle comprising
an outer nozzle case arranged to extend around a central axis, the outer nozzle case having an outer surface facing away from the central axis and an opposite inner surface facing toward the central axis and defining an interior space radially inwardly from the inner surface,
a nozzle plug located at least partially within the interior space and along the central axis and configured to interact with hot exhaust gases flowing through the interior space in an aft direction to guide the hot exhaust gases out of the interior space through an exhaust outlet at an aft end of the outer nozzle case, the nozzle plug including a movable plug body extending in the aft direction along the central axis and a plurality of support struts coupled to the movable plug body and spaced circumferentially apart from one another around the central axis to support the movable plug body along the central axis, and
a plug actuator coupled with the outer nozzle case and the nozzle plug and configured to move at least a portion of the nozzle plug relative to the outer nozzle case between a slid-forward position and a slid-back position, wherein the plug actuator includes an actuator ring coupled to each of the support struts, an actuator piston coupled to the actuator ring and to the outer nozzle case and configured to translate the actuator ring forward and aft to move the movable plug body and the plurality of support struts between the slid-forward position and the slid-back position, and a plurality of ring guides coupled to the actuator ring and to the outer nozzle case to guide movement of the actuator ring relative to the outer nozzle case and block circumferential rotation of the movable plug body and the plurality of support struts about the central axis, wherein the plurality of ring guides includes a plurality of rollers that engage the outer nozzle case and roll along the outer nozzle case as the actuator piston moves the actuator ring forward and aft, and wherein the outer nozzle case is formed to include a ring cavity and the actuator ring is received in the ring cavity when the movable plug body is in the slid-forward position and the actuator ring is partially removed from the ring cavity to form a portion of an outer exhaust gas boundary with the inner surface of the outer nozzle case when the movable plug body is in the slid-back position.

2. The exhaust nozzle of claim 1, wherein the outer nozzle case is formed to include a plurality of slots that open radially inward into the ring cavity, and wherein each of the rollers is received in a respective slot included in the plurality of slots.

3. The exhaust nozzle of claim 2, wherein the nozzle plug further includes a stationary tailcone located within the interior space upstream of the exhaust outlet and formed to include a stem-receiving space, and wherein the movable plug body includes a plug tail, a plug stem coupled with a forward end of the plug tail and arranged to extend into the stem-receiving space formed in the stationary tailcone, and a plug guide fixed to the plug stem for movement therewith and arranged to extend into a guide slot opening into the stem-receiving space to block rotation of the movable plug body relative to the stationary tailcone about the central axis.

4. An exhaust nozzle for a turbine engine, the exhaust nozzle comprising an outer nozzle case arranged to extend around a central axis, the outer nozzle case having an outer surface facing away from the central axis and an opposite inner surface facing toward the central axis and defining an interior space radially inwardly from the inner surface, a nozzle plug located at least partially within the interior space and along the central axis and configured to interact with hot exhaust gases flowing through the interior space in an aft direction to guide the hot exhaust gases out of the interior space through an exhaust outlet at an aft end of the outer nozzle case, the nozzle plug including a stationary tailcone located within the interior space upstream of the exhaust outlet, a movable plug body extending in the aft direction away from the stationary tailcone along the central axis, and a plurality of support struts coupled to the movable plug body and spaced circumferentially apart from one another around the central axis to support the movable plug body along the central axis, a plug actuator coupled with the outer nozzle case and the movable plug body and configured to move the movable plug body relative to the outer nozzle case and the stationary tailcone between a slid-forward position and a slid-back position, wherein the movable plug body includes a plug tail having a variable-diameter, a plug stem coupled with a forward end of the plug tail and having a substantially constant diameter, and a plug guide fixed to the plug stem for movement therewith and configured to engage the stationary tailcone to block rotation of the movable plug body relative to the stationary tailcone about the central axis, wherein the plug actuator includes an actuator ring coupled to each of the support struts, an actuator piston coupled to the actuator ring and to the outer nozzle case and configured to translate the actuator ring forward and aft to move the movable plug body and the plurality of support struts between the slid-forward position and the slid-back position, and a plurality of ring guides coupled to the actuator ring and to the outer nozzle case to guide movement of the actuator ring relative to the outer nozzle case, wherein the plurality of ring guides includes a plurality of rollers that engage the outer nozzle case and roll along the outer nozzle case as the actuator piston moves the actuator ring forward and aft, and wherein the outer nozzle case is formed to include a ring cavity and the actuator ring is received in the ring cavity when the movable plug body is in the slid-forward position and the actuator ring is partially removed from the ring cavity to form a portion of an outer exhaust gas boundary with the inner surface of the outer nozzle case when the movable plug body is in the slid-back position.

5. The exhaust nozzle of claim 4, wherein the stationary tailcone is formed to include a stem-receiving space located along the central axis and the plug stem extends into the stem-receiving space of the stationary tailcone.

6. The exhaust nozzle of claim 5, wherein the plug stem extends into the stem-receiving space in both the slid-forward position and the slid-back position.

7. The exhaust nozzle of claim 5, wherein the plug guide includes a plurality of rollers spaced circumferentially around the central axis from one another and protruding radially outward from an outer surface of the plug stem to engage with an interior surface defining the stem-receiving space.

8. The exhaust nozzle of claim 7, wherein the stem-receiving space includes a plurality of guide slots spaced circumferentially apart from one another, and wherein each roller included in the plurality of rollers is configured to extend into a respective guide slot included in the plurality of guide slots.

9. The exhaust nozzle of claim 4, wherein the outer nozzle case is formed to include a plurality of slots that open radially inward into the ring cavity, and wherein each of the rollers is received in a respective slot included in the plurality of slots.

10. The exhaust nozzle of claim 9, wherein each of the support struts included in the plurality of support struts is aligned circumferentially with at least one slot included in the plurality of slots.

11. The exhaust nozzle of claim 4, wherein the plurality of rollers includes a plurality of forward rollers and a plurality of aft rollers spaced apart from the plurality of forward rollers.

12. The exhaust nozzle of claim 4, wherein each of the support struts included in the plurality of support struts is aligned circumferentially with at least one roller included in the plurality of rollers.

13. The exhaust nozzle of claim 4, wherein each of the plurality of support struts extends inwardly toward the central axis away from the actuator ring and aft away from the actuator ring.

14. The exhaust nozzle of claim 4, wherein each of the rollers is configured to rotate about a roller axis that extends through the central axis.

15. The exhaust nozzle of claim 4, wherein the plug stem has a first diameter, and wherein the plug tail has a second diameter, greater than the first diameter, at a first end of the plug tail closest to the plug stem, a third diameter, less than the first diameter and the second diameter, at a second end of the plug tail furthest from the plug stem, and a fourth diameter, greater than the first, second, and third diameters, axially between the first end and the second end.

\* \* \* \* \*